United States Patent
Davitt

(10) Patent No.: US 11,776,349 B2
(45) Date of Patent: Oct. 3, 2023

(54) VENDING MACHINES

(71) Applicant: Maxwell Paul Davitt, Brompton (GB)

(72) Inventor: Maxwell Paul Davitt, Brompton (GB)

(73) Assignee: Maxwell Paul Davitt, Brompton (GB)

( * ) Notice: Subject to any disclaimer, the term of this patent is extended or adjusted under 35 U.S.C. 154(b) by 960 days.

(21) Appl. No.: 16/622,466

(22) PCT Filed: Jun. 18, 2018

(86) PCT No.: PCT/GB2018/051682
§ 371 (c)(1),
(2) Date: Dec. 13, 2019

(87) PCT Pub. No.: WO2018/229513
PCT Pub. Date: Dec. 20, 2018

(65) Prior Publication Data
US 2021/0150844 A1 May 20, 2021

(30) Foreign Application Priority Data
Jun. 16, 2017 (GB) .................................. 1709632

(51) Int. Cl.
*G07F 11/52* (2006.01)
*G07F 17/00* (2006.01)

(52) U.S. Cl.
CPC .......... *G07F 11/52* (2013.01); *G07F 17/0064* (2013.01)

(58) Field of Classification Search
CPC ...................................................... G07F 11/52
See application file for complete search history.

(56) References Cited

U.S. PATENT DOCUMENTS

| 768,412 A | 8/1904 | Wagner |
| 1,237,919 A | 8/1917 | Linkiewicz |

(Continued)

FOREIGN PATENT DOCUMENTS

| EP | 0207836 A1 | 1/1987 |
| EP | 2608164 A2 | 6/2013 |

(Continued)

OTHER PUBLICATIONS

Combined Search and Examination Report under Section 17 and 18(3) for Application No. GB2013691.7 dated Sep. 18, 2020; 7 pages.

(Continued)

*Primary Examiner* — Gene O Crawford
*Assistant Examiner* — Ayodeji T Ojofeitimi
(74) *Attorney, Agent, or Firm* — Squire Patton Boggs (US)

(57) ABSTRACT

Vending machines, in particular to vending machines for vending discrete products, such as confectionery (sweets and candies). Described is a vending machine for dispensing discrete products, wherein the vending machine comprises at least one storage container for products to be dispensed and a dispensing assembly in communication with the storage container; wherein the storage container includes a plurality of baffles to support products within the container and direct flow of products from the storage container to the dispensing assembly. The dispensing assembly comprises a dispensing cylinder mounted for rotation within the machine and the dispensing assembly includes indexing means adapted to cause stepwise rotation of the dispensing cylinder. Preferably, the indexing means comprises at least one indexing disc associated with the dispensing cylinder and the dispensing assembly further comprises an actuator arm (Continued)

associated with the or each indexing disk, the actuator arm being mounted for reciprocal motion.

20 Claims, 9 Drawing Sheets

(56) References Cited

U.S. PATENT DOCUMENTS

| | | | |
|---|---|---|---|
| 1,610,717 A | | 12/1926 | Teabout et al. |
| 3,362,579 A | | 1/1968 | Newberry |
| 4,768,683 A | | 9/1988 | Gold et al. |
| 4,852,767 A | | 8/1989 | Humphrey |
| 6,206,234 B1 | * | 3/2001 | Rawlins ............... G07F 11/007 221/131 |
| 6,286,710 B1 | * | 9/2001 | Paek ..................... G07F 9/02 221/124 |
| 2003/0024944 A1 | * | 2/2003 | Chang .................. G07F 11/54 221/119 |
| 2006/0000848 A1 | * | 1/2006 | Humphrey ............ G07F 11/44 221/283 |
| 2010/0065577 A1 | | 3/2010 | Coughlin et al. |
| 2012/0029690 A1 | | 2/2012 | Bruck et al. |
| 2014/0303774 A1 | * | 10/2014 | Schwarzli .............. G07F 9/02 700/233 |
| 2015/0108177 A1 | | 4/2015 | Junkell |
| 2016/0244267 A1 | | 8/2016 | Rendell |

FOREIGN PATENT DOCUMENTS

| | | |
|---|---|---|
| EP | 2608164 A2 | 6/2013 |
| WO | WO 97/01157 A1 | 9/1997 |
| WO | WO 00/72277 A1 | 11/2000 |

OTHER PUBLICATIONS

Examination Report under Sections 18(3) for Application No. GB1709632.2, dated Mar. 10, 2020; 4 pages.

International Search Report and Written Opinion of the International Searching Authority of PCT/GB2018/051682 dated Sep. 27, 2018; 17 pages.

Combined Search and Examination Report under Sections 17 and 18(3) for Application No. GB1709632.2, dated Jul. 26, 2017; 8 pages.

Anonymous: "Cam-Driven Lever-Ratchet Mechanism", Nov. 25, 2013, XP055506555, Retrieved from the Internet: URL:https://www.europeana.eu/portal/en/record/2020801/dmglib_handler_image_24885023. html [retrieved on Sep. 12, 2018].

Combined Search and Examination Report under Section 17 and 18(3) for Application No. GB2102041.7 dated Mar. 8, 2021; 5 pages.

European Search Report dated Jul. 29, 2022 for European Application No. 18737354.3.

Anonymous: "Cam-Driven Lever-Ratchet Mechanism", Nov. 25, 2013, XP055506555, Retrieved from the Internet: URL:https://www.europeana.eu/portal/en/record/2020801/dmglib_handler_image_24885023.html [retrieved on Sep. 12, 2018]. 1 page.

* cited by examiner

VENDING MACHINES

The present invention relates to vending machines, in particular to vending machines for vending discrete products, such as confectionery (sweets and candies).

Vending machines for vending confectionery, more specifically unpackaged products such as hard-cased confectionery, such as M&Ms or Smarties (registered trade marks) are known. However, known machines have proven to be unsuitable for dispensing soft-coated or jellied confectionery products.

Soft-coated sweets have a higher level of surface moisture than do hard shell confectionery such as sugar-coated chocolate sweets. This tends to make the sweets adhere to each other and their container, whereas hard-shell confectionery remains relatively free-flowing. Additionally, when constrained within a container, the mass of soft sweets tends to cause agglomeration, especially of those sweets towards the bottom of the container. The sweets become a congealed solidified mass from which it is effectively impossible to dispense individual sweets.

The present invention seeks to overcome this problem. It seeks to be able to provide an apparatus able to store, separate and dispense a pre-determined amount (number, volume or mass) of sweets, whether hard-shell sweets or soft-coated or jellied sweets, in a reliable and controlled manner.

In its broadest sense, the present invention provides a vending machine for dispensing discrete products, wherein the vending machine comprises at least one storage container for products to be dispensed and a dispensing assembly in communication with the storage container; wherein the storage container includes a plurality of baffles to support products within the container and direct flow of products from the storage container to the dispensing assembly.

The dispensing assembly comprises a dispensing cylinder mounted for rotation within the machine and the dispensing assembly includes indexing means adapted to cause stepwise rotation of the dispensing cylinder.

Preferably, the indexing means comprises at least one indexing disc associated with the dispensing cylinder and the dispensing assembly further comprises an actuator arm associated with the or each indexing disk, the actuator arm being mounted for reciprocal motion.

Preferably, the indexing means comprises a toothed disc or gear; the actuator arm has a distal end adapted sequentially, in use, to engage and bear against a tooth of the toothed disc to advance the dispensing cylinder.

Preferably, the actuator arm has a proximal end mounted to a reciprocatable member, wherein the reciprocatable member is moveable between a first configuration in which the distal end of the arm does not bear against a respective tooth of the toothed disc and a second configuration in which distal end of the arm bears against a tooth to advance the cylinder.

Preferably, the reciprocatable member is moveable by means of an electric motor.

Preferably, the electric motor has an eccentric, cam or elliptical gear mounted to the output shaft thereof and wherein the reciprocatable member includes a surface against which the eccentric, cam or elliptical gear bears, in use, to cause reciprocal movement of the reciprocatable member.

Alternatively, the reciprocatable member is moveable by means of a user-operated mechanical mechanism.

Preferably, the baffles are arranged in opposed pairs, comprising an operatively upper pair and an operatively lower pair.

Preferably, the upper pair of baffles are arranged in an inverted-V shape.

Preferably, the lower pair of baffles are arranged in a V-shape configuration with a space between the baffles.

Preferably, the storage container is provided with a base and the reciprocatable member is arranged, as it moves between the first configuration and the second configuration, to push products along the base to the dispensing cylinder.

Preferably, the dispensing cylinder comprises a shaft having a plurality of axial dividing walls or vanes dividing the cylinder into a plurality of axial product-receiving cavities.

Preferably, each wall or vane includes an axial aperture proximal the shaft.

Preferably, the dispensing cylinder comprises a plurality of radially arranged rods.

Preferably, the dispensing cylinder further comprises an elasticated cover or sheath.

Preferably, the elasticated cover or sheath is formed of a rubber material, preferably polyurethane rubber.

Preferably, the machine further comprises at least one agitation bar.

Preferably, the agitation bar is longitudinally positioned generally centrally between side walls of the hopper and mounted between front and rear walls of the hopper.

Preferably, the agitation bar is formed of a bar or rod having a tube provided thereover for free rotation about the rod.

Preferably, the machine further comprises a control or metering arrangement provided vertically intermediate the dispensing cylinder and a second dividing wall or baffle.

Preferably, the metering arrangement includes at least one tube mounted for free rotation about a rod.

Preferably, a pair of tubes and rods are mounted between the front and rear walls of the hopper in a vertical orientation with a small gap therebetween, preferably the gap being slightly larger than the diameter of the tubes.

The above and other aspects of the present invention will now be described in further detail, by way of example only, with reference to the accompanying drawings, in which.

Figure 1:
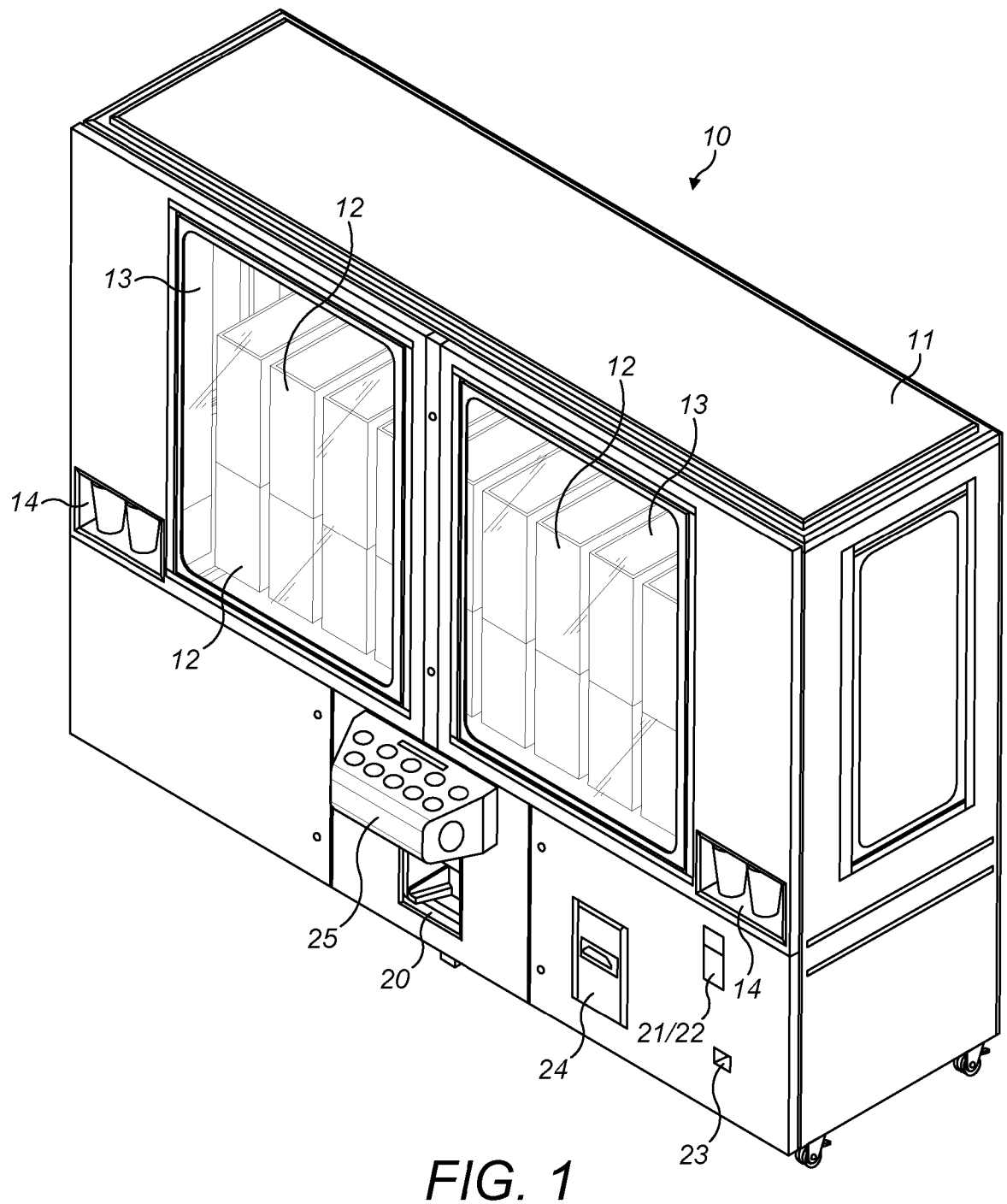
FIG. 1 is a perspective view of a first embodiment of a vending machine in accordance with the present invention.
Figure 2:
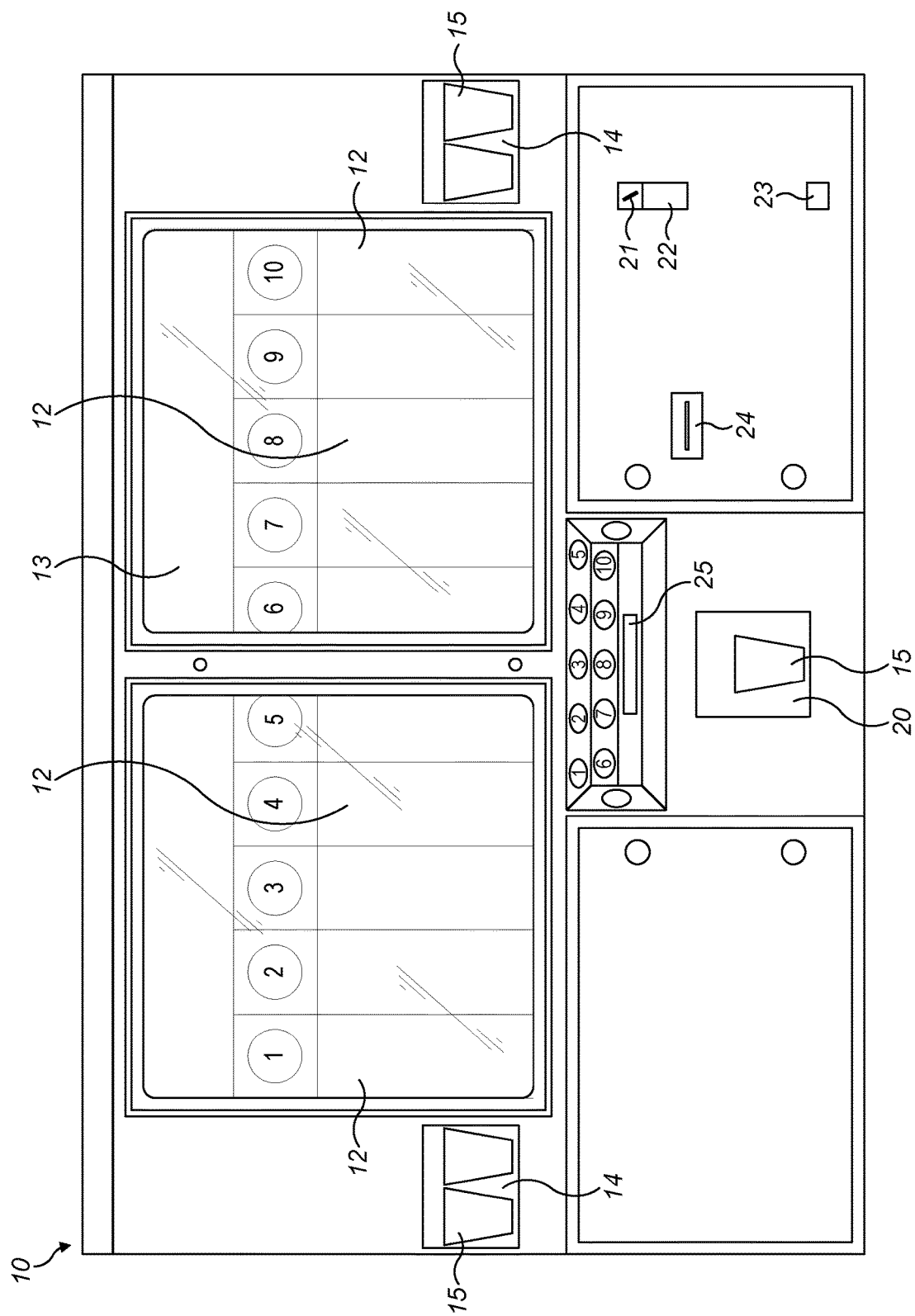
FIG. 2 is a schematic front view of the embodiment of FIG. 1.

FIGS. 1 and 2 show an embodiment of a vending machine 10 in accordance with the present invention. The vending machine 10 has a case 11 enclosing a plurality of storage hoppers 12 (ten are shown in this embodiment) for storage and dispensing sweets, candies or other discrete products to be vended.

Case 11 has transparent windows 13 through which the hoppers 12 and their contents can be viewed by potential customers. In the embodiment shown, the vending machine 10 includes at least one storage compartment 14 for the storage of cups 15 into which sweets will be dispensed via a discharge chute (not shown) to a cup 15 placed manually by a customer in a dispensing cavity 20. In alternative embodiments, cup management is automated, as is known in the art of vending machines. Optionally, the dispensing cavity is fitted with a sliding transparent door, not shown, to maintain cleanliness within the cavity.

Vending machine 10 further includes apparatus to take payment for the sweets or candies dispensed. In the embodiment shown, the payment apparatus comprises i) a coin-freed mechanism comprising a coin slot 21 for insertion of coins, and having a coin-return button 22 and coin return cavity 23; and ii) a note acceptor assembly 24. In alternative embodiments, the payment apparatus further comprises a credit and debit card transaction assembly.

The vending machine includes a selection panel including a plurality of input switches 25 to allow the user to select from which hopper 12 they wish to dispense sweets. In the embodiment shown, one input switch corresponds with each numbered hopper. In alternative embodiments, particularly in machines having over ten hoppers, input switches correspond with the digits 0 and 1 to 9. It will be appreciated that the switches 25 may be individual mechanical switches or may be represented by a touch-sensitive screen, displaying the switch numbers.

Figure 3:
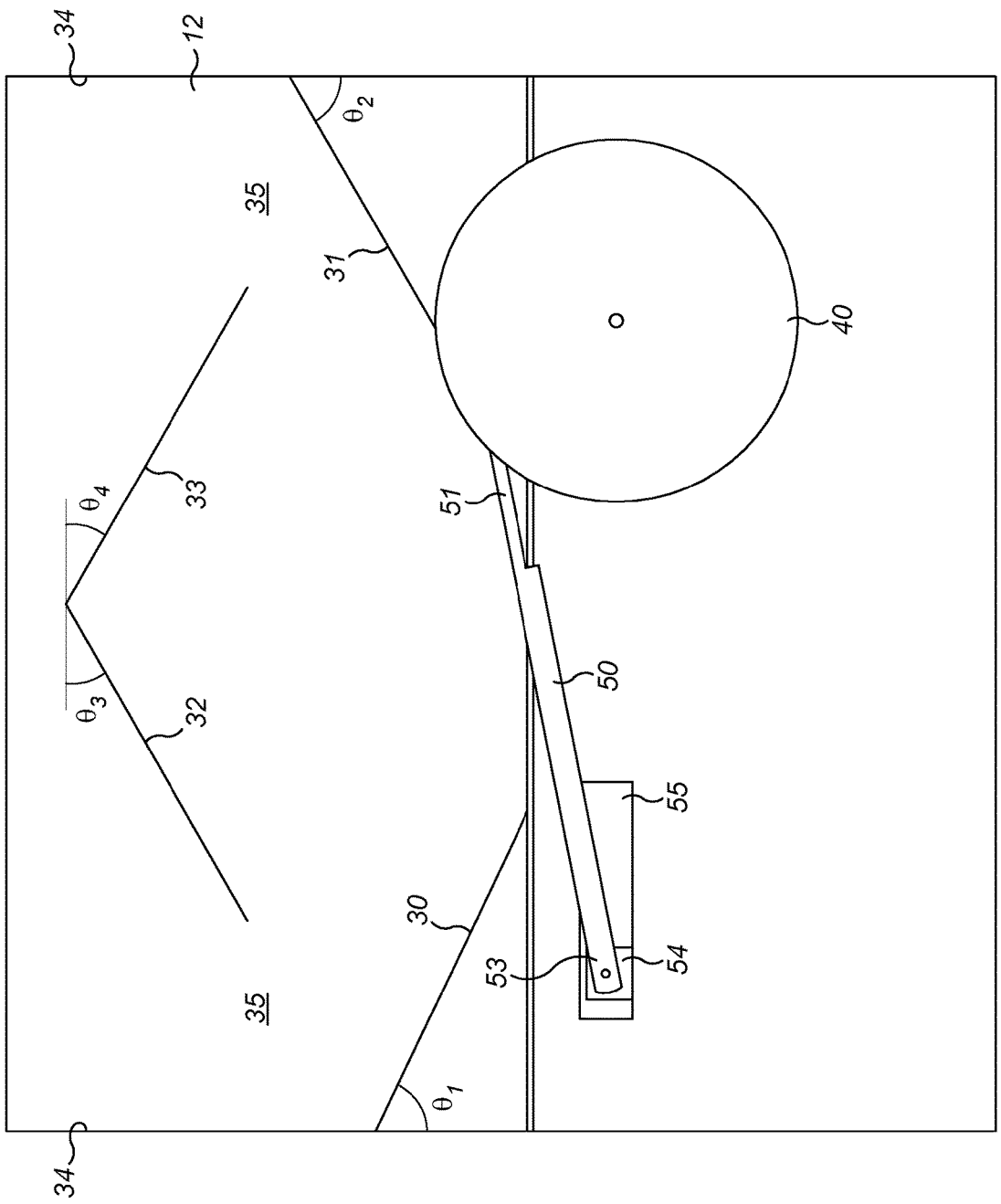
FIG. 3 is a schematic view of the principle operative components of the vending machine of FIG. 1.

FIG. 3 illustrates schematically the principal components of the dispensing mechanism of the vending machine of FIGS. 1 and 2.

Hopper 12 has a cavity for storage of sweets to be dispensed. In a typical embodiment, the hopper is designed to hold approximately 10 kg of sweets. The hopper cavity includes a plurality of internal dividing shelves to support and distribute the weight of the sweets. First and second lower dividing shelves 30, 31 are provided proximate the base of the cavity, arranged in an opposed, angled orientation to direct sweets to the correct location for dispensing the sweets from the cavity to the dispensing cavity 20. Second lower dividing shelf 31 is positioned above and adjacent dispensing cylinder 40, which will be discussed in further detail below.

Suitably, lower dividing shelves 30,31 are each set at an angle of between 30° and 60° to the respective adjacent vertical wall 34. It has been determined that inclining shelf 30 at an angle $\Theta_1$ of about 45° to the adjacent vertical wall 34 and inclining shelf 31 at an angle $\Theta_2$ of about 40° to the adjacent vertical wall provides reliable flow guidance along the shelves towards the dispensing cylinder for sweets to be dispensed, with second dividing shelf 31 thereby being more inclined to the horizontal than the first dividing shelf.

One or both of the lower dividing shelves 30,31 may be provided with supplementary shelf portions to aid in direction of confectionery through and from the hopper 12.

A pair of upper dividing shelves 32,33 is provided spaced operatively above the first pair of shelves. The two shelves 32,33 of the upper pair are arranged together in an inverted V configuration mounted generally centrally with respect to the width of the cavity and inclined at an angle such that sweets are supported but can slide down the shelves as required for dispensing. The upper pair of dividing shelves 32,33 is spaced from the side walls 34 of the hopper 12 such that, in use, sweets can slide down one of the upper pair of shelves 32,33 and fall or flow through spaces 35 between the side walls 34 and the upper and lower dividing shelves 30,31,32,33.

Typically, dividing shelves 32, 33 are each set at an angle of about 60° to each other and are symmetrically arranged about a vertical axis, thereby defining angles to the horizontal (operatively) of $\Theta_3$ and $\Theta_4$ respectively, wherein $\Theta_3$ substantially equals $\Theta_4$ and both $\Theta_3$ and $\Theta_4$ are about 30°.

Figure 4:
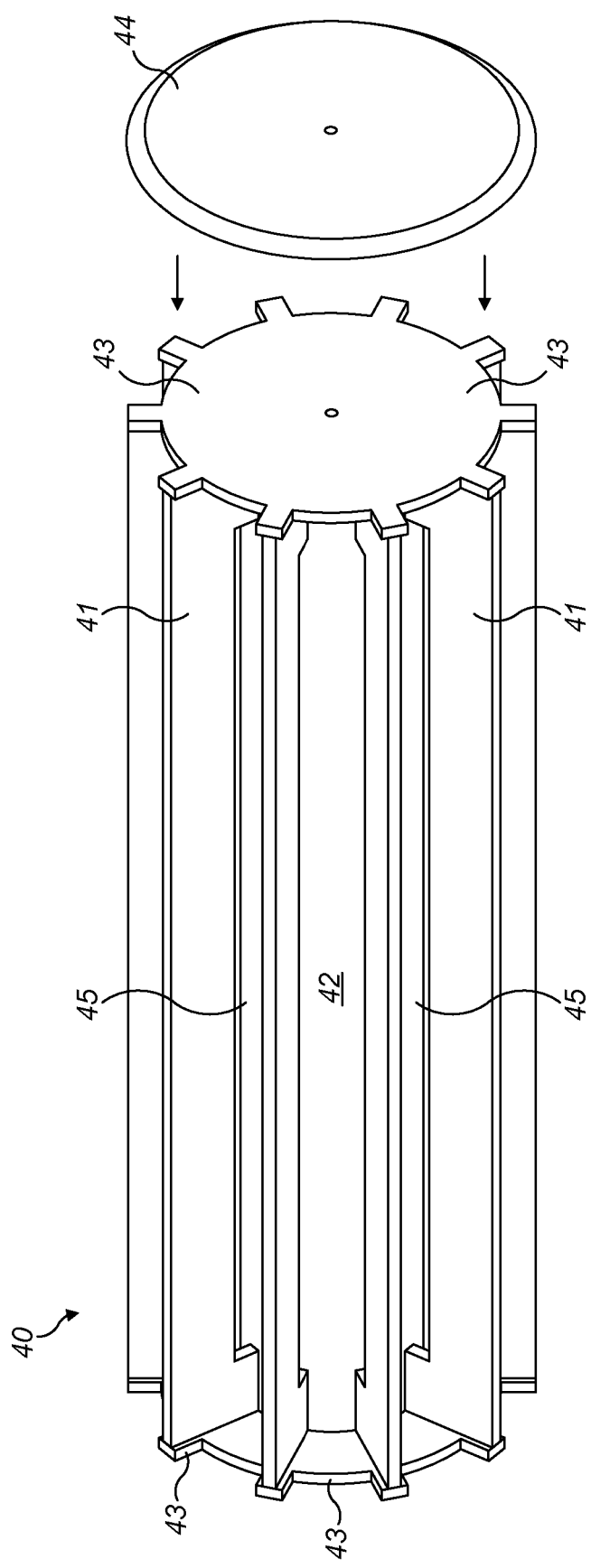
FIG. 4 is an exploded view of the dispensing cylinder of the dispense mechanism of FIG. 3.
Figure 5:
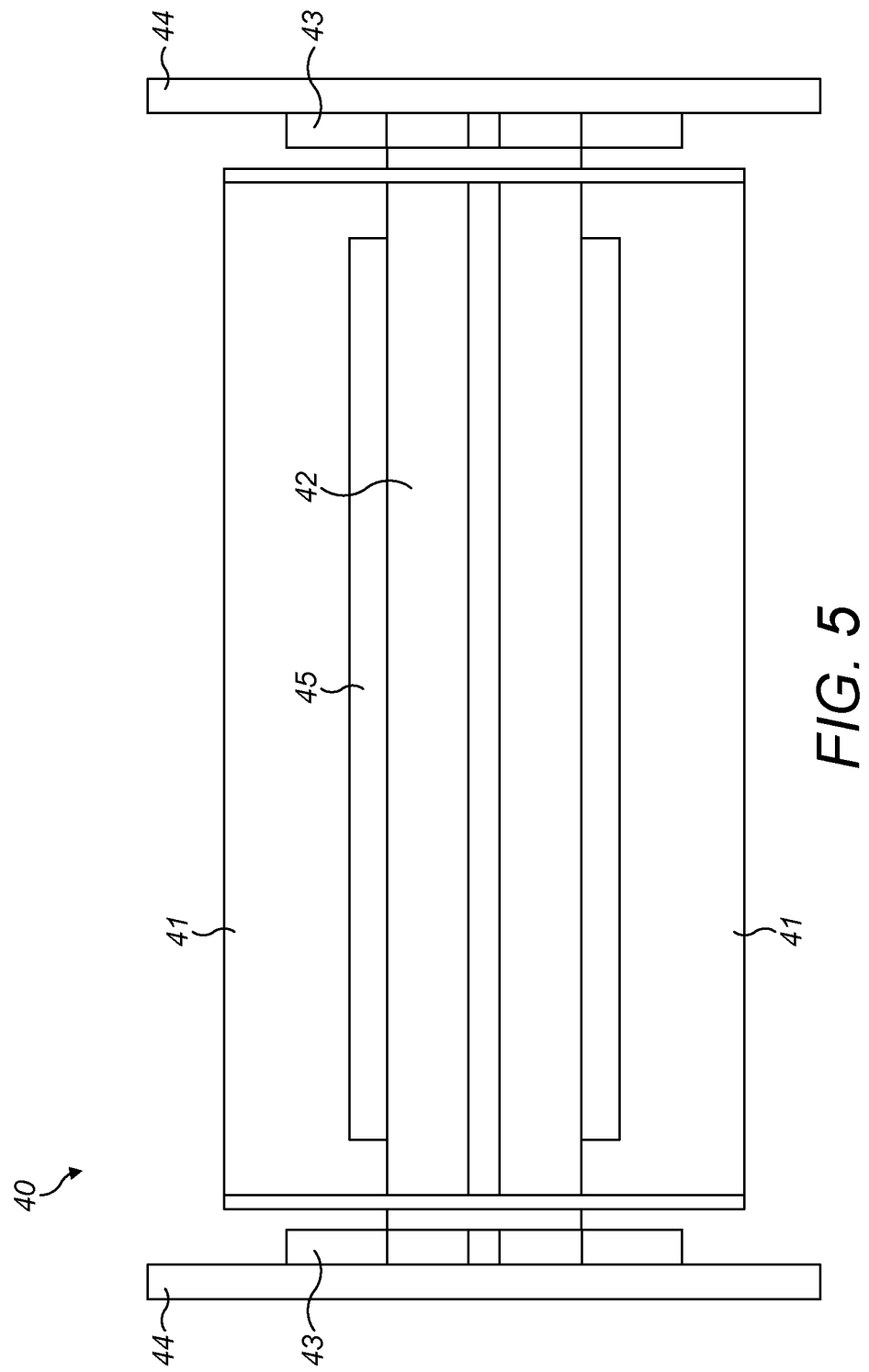
FIG. 5 is a plan view of the gear of the dispensing cylinder of FIG. 4.

As sweets flow through the hopper 12, they descend towards a dispensing cylinder 40. In the embodiment shown in FIGS. 4 to 6, dispensing cylinder 40 includes a plurality of axially orientated dividing walls or vanes 41 mounted to a central tube or spindle 42. The dividing walls divide the cylinder into a corresponding plurality of elongate cavities for receipt, in use, of sweets to be dispensed. The number of walls or vanes and the length of the cylinder are chosen to define a predetermined volume corresponding to the volume of sweets to be dispensed. In the embodiment shown, each wall 41 includes at least one aperture 45. This acts, in use, to allow any sugar which may fall from the sweets in the hopper to fall into the collector cup with the next dispense of sweets. As shown, there is a single, elongate aperture.

Dispensing cylinder 40 includes an indexing disc 43 associated with at least one end of the cylinder, preferably both ends, and optionally including a cover disc 44. In the embodiment shown in FIGS. 4 to 6, each indexing disc 43 consists of a toothed gear formed as an end wall to the dividing walls 41 to form the dispensing cylinder. An alternative embodiment will be described below.

Dispensing cylinder 40 is mounted axially for rotation within or adjacent a lower portion of hopper 12, intermediate the hopper 12 and the dispensing cavity 20. The cylinder is caused to rotate in an indexed manner by means of a reciprocatably-mounted actuating arm 50. Suitably, the apparatus includes a pair of actuating arms 50, each acting on respective indexing discs at respective ends of the dispensing cylinder.

Actuating arm 50 has a distal end 51 adapted to bear against a tooth 52 of indexing gear 43 and a proximal end 53 pivotably mounted to an operatively reciprocatable mount 54, mounted for sliding movement within a guide 55, suitably formed as a pair of slots within a reciprocatable mount housing.

Figure 6:
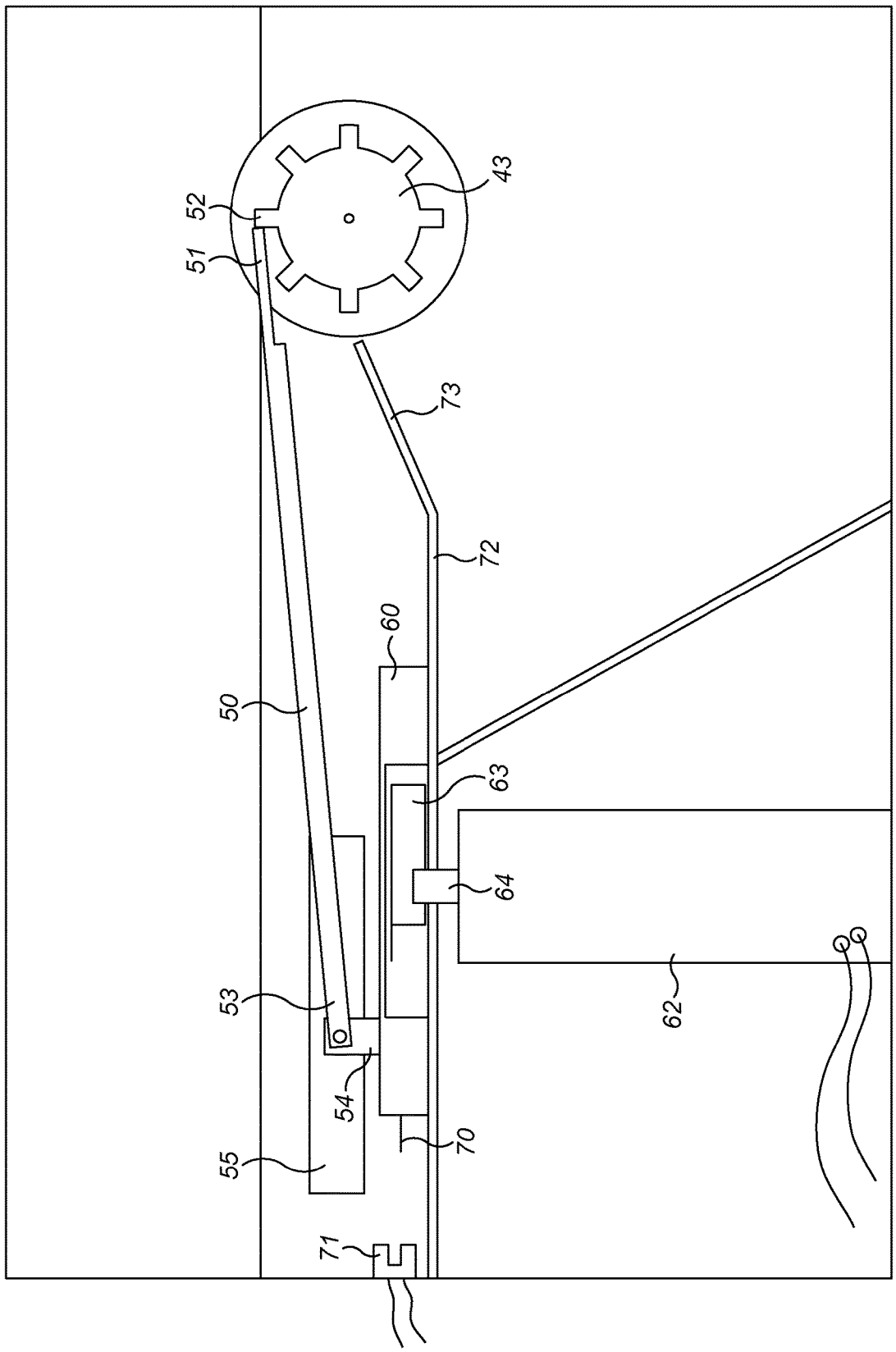
FIG. 6 is a schematic side view of the principal components of the dispense mechanism of the embodiment of FIG. 1

In the embodiment of FIG. 6, reciprocatable mount 54 is mounted to an upper surface of a reciprocatable mount support 60 which includes a cavity 61 on an underside thereof. The reciprocatable mount 54 is caused to reciprocate by means of a motor 62 having a cam, elliptical gear or eccentric 63 mounted to its output shaft 64 which cavity 61 and cam 63 are designed to co-operate to impart a reciprocal motion to the reciprocatable mount 54.

Mounted to the reciprocatable mount support 60 is a blade 70 which is adapted to co-operate with an optical sensor 71 mounted to a suitable inner surface of the apparatus. In a rest position, between dispensing operations, blade 70 rests within optical sensor 71. Alternative arrangements will be readily apparent to the skilled person. In use, motor 62 is actuated by the customer selecting their choice of sweets by operating the respective switch or switches 25. This causes operation of the motor 62 and thus cam 63, which thereby causes mount support 60 to be moved from its rest position, with blade 70 adjacent sensor 71, to a position as shown in FIG. 6 in which actuating arm 50 engages and bears against a tooth 52 of indexing gear to cause rotation of the dispensing cylinder 40 and thereby dispensing of sweets retained within an elongate cavity of the cylinder to the dispensing cavity 20.

As the motor spindle continues to rotate, cam 63 causes mount support 60 to return to the rest position and thereby causes blade 70 to engage optical sensor 71 which operates to remove power to the motor. At this point, further sweets will fall into the next available elongate cavity of the cylinder, ready for the next operation of the apparatus, which may be dispensing from the same or a different hopper to complete all selections made by one customer or may be operation by a new customer.

In preferred embodiments, such as that shown in FIG. 6, a base 72 is provided to the hopper 12 on which sweets within the hopper will rest prior to being dispensed. Base 72 includes an inclined portion 73 directed towards the dispensing cylinder 43 and the mount support 60 is dimensioned and positioned such that, during operation of the motor to advance the support 60 from the rest position, the mount support also acts to push sweets towards and into the dispensing cylinder. Hence, in the preferred embodiments, lower inclined shelf 31 is dimensioned and positioned to act as a cover to dispensing cylinder 43 to prevent sweets falling directly from the mass of sweets within the hopper into the dispensing cylinder. Since the length of forward travel of the mount support 60 is fixed and because the or each actuating arm 50 is of fixed length, giving it a predefined length of travel, only a predetermined amount of each particular sweet will, within allowable tolerances, be loaded into each elongate cavity of the dispensing cylinder.

Base 72 is preferably perforated such that any sugar coating to the sweets in the hopper is able to fall through the base 72 as the sweets are pushed along by the mount support 60. The sugar falls into the cup placed in the dispensing cavity 20, thereby preventing build-up of sugar falling from the sweets on the wearing surfaces of the shelf.

In a typical embodiment, whilst the apparatus is awaiting user input, three elongate cavities of each dispensing cylinder the will be charged with sweets ready for dispensing.

In certain embodiments, the operation of the machine is programmed to allow a user to input a plurality of hopper numbers. Suitably, the programming allows a user to make five selections, which may be the same or different, to fill a cup placed in the dispensing cavity. In these embodiments, preferably an optical switch is provided between proximal the cup in the dispensing cavity to sense when the sweets from one selection has been dispensed, triggering actuation of the hopper corresponding to the customer's next selection; and so on until the customer's selections have been completed.

In preferred embodiments, the apparatus includes visual and audible prompts to direct a customer on use of the machine and to advise when the order has been completed. The apparatus therefore includes a suitable electronic processing unit (not shown) to provide this functionality.

Figure 7:
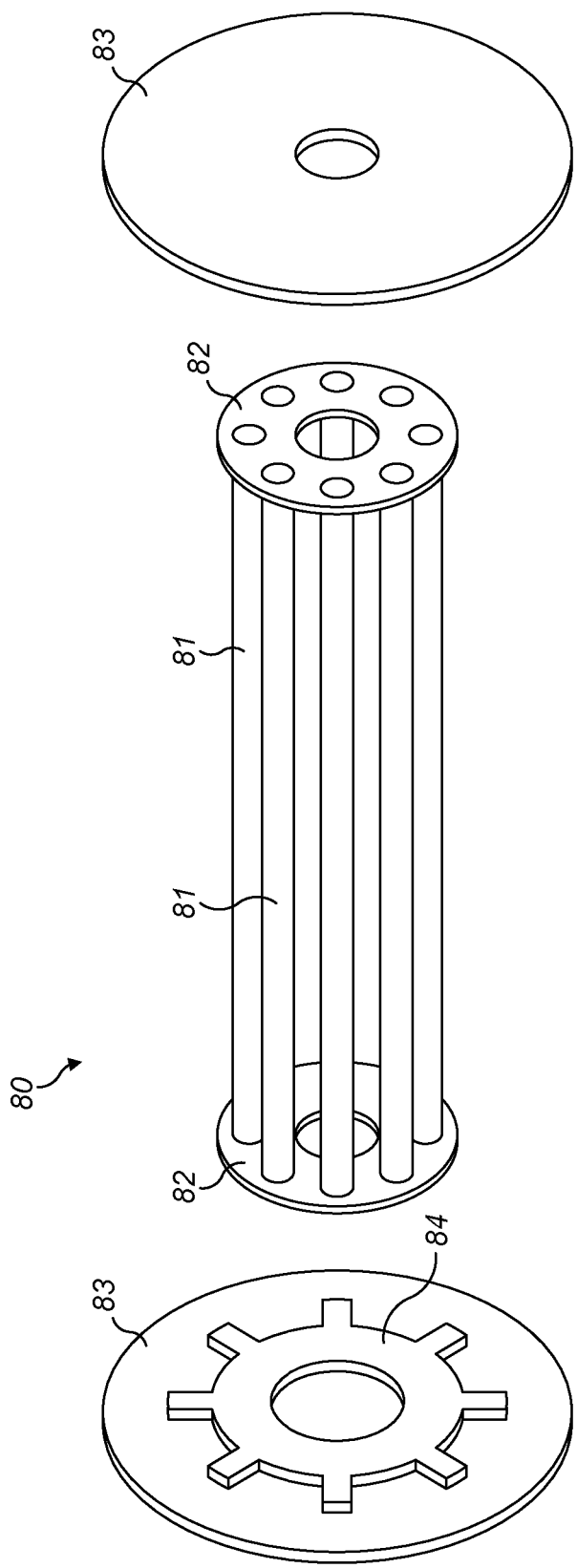
FIG. 7 is a perspective exploded side view of an alternative embodiment of a dispensing cylinder of a vending machine in accordance with the present invention.
Figure 8:
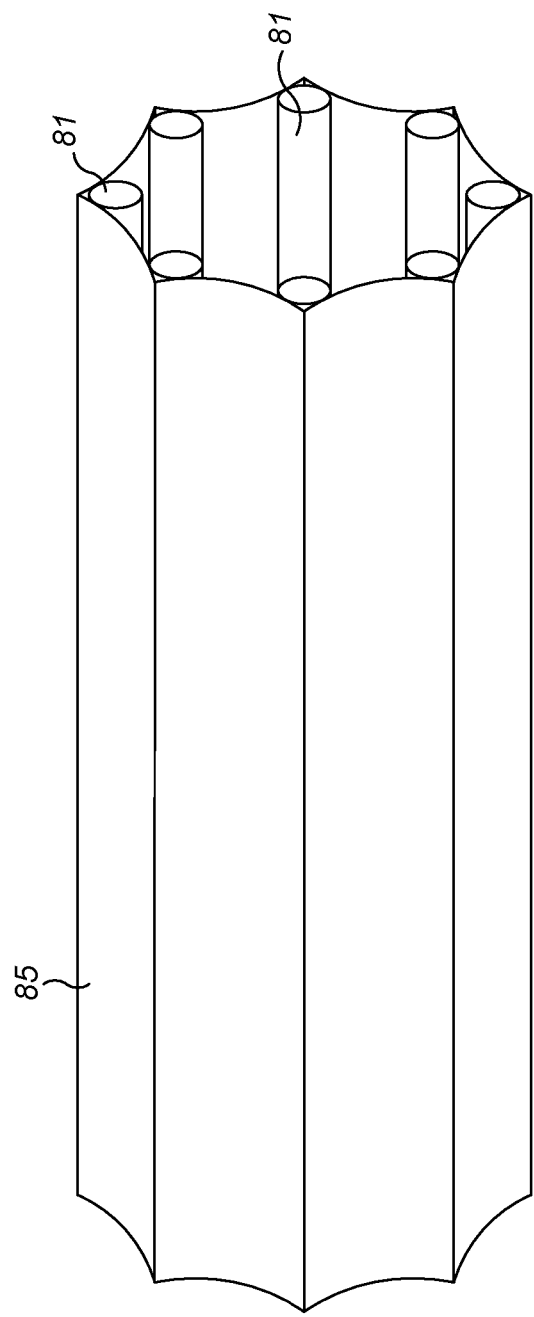
FIG. 8 is an perspective view of the dispensing cylinder of FIG. 7 with elasticated cover or sheath in place.
Figure 9:
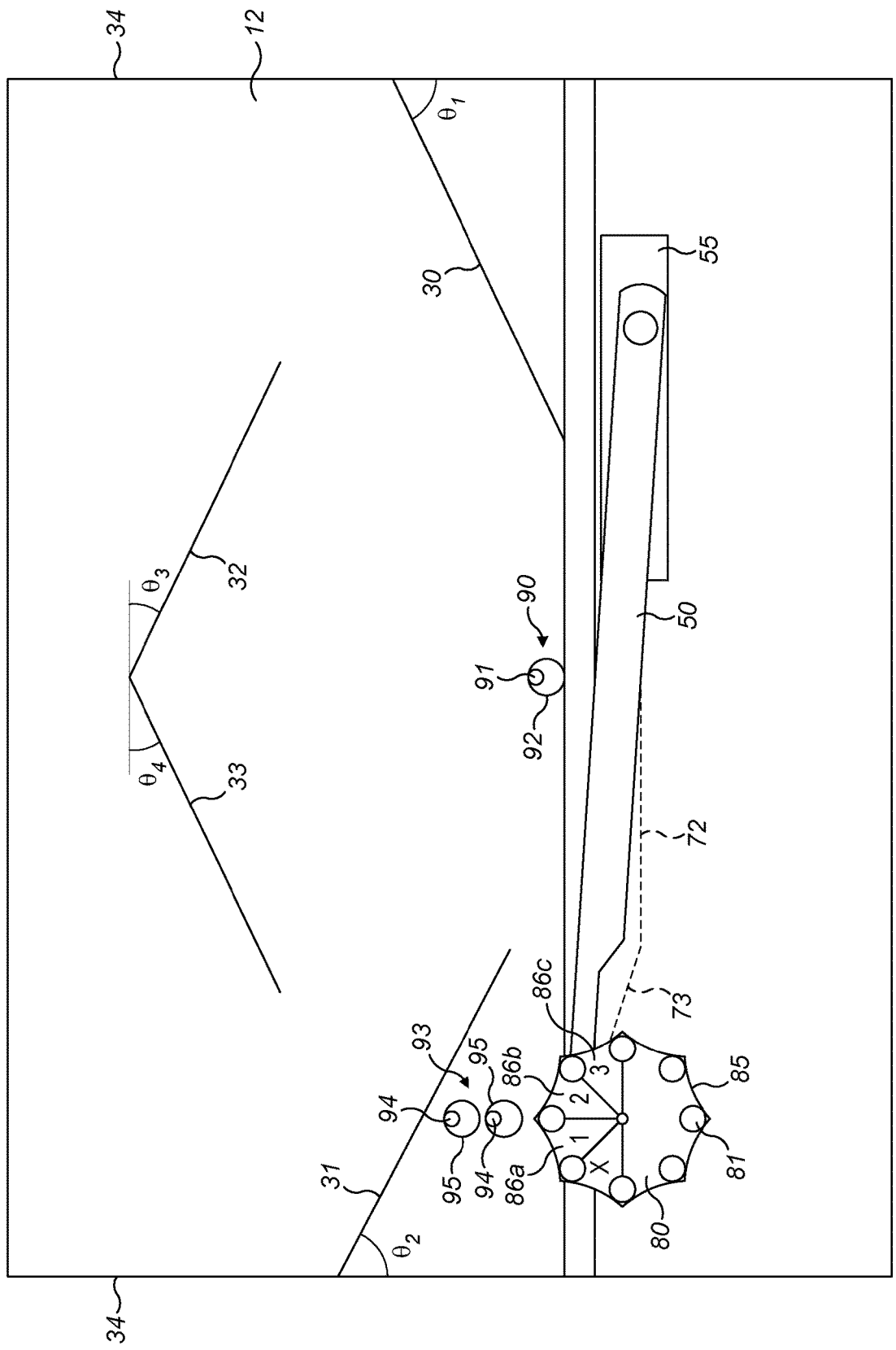
FIG. 9 is a schematic side view of the principal operative components of an embodiment of a vending machine in accordance with the present invention incorporating the dispensing cylinder of FIGS. 7 and 8.

A further embodiment of a dispensing cylinder and its operation is illustrated in FIGS. 7 to 9. The cylinder 80 is formed of a plurality of rods 81 mounted between end plates 82, to each of which is mounted a cap 83 incorporating an indexing disc 84. Each cylinder 80 is fitted with an elasticated cover 85 (FIG. 8). The elasticated cover or sheath 85 provides a readily deformable fit over rods 81 of the cylinder such that it is deformable under the gentle pressure of sweets being pushed into the dispensing cylinder, thereby forming a plurality of elongate metering cavities 86a, 86b, 86c and so on. The elastic biasing force of the elasticated cover or sheath 85 is sufficient, as the cylinder rotates to dispense sweets, to urge, in turn, sweets out of each elongate metering cavity 86 thereby formed to the dispensing cavity.

The elasticated cover is formed from any suitable food-grade elastic material, such as rubber. Polyurethane rubber is particularly suitable. The use of an elasticated cover further has the advantage that the cover is readily replaceable, allowing rapid servicing of the machine without either having to replace the dispensing cylinder or regularly washing the cylinder, which would then require an extended period in which to dry before being re-assembled into the machine.

FIG. 9 is a side schematic view of an embodiment of a machine incorporating an embodiment of a dispensing cylinder as shown in FIGS. 7 and 8. The operation is essentially the same as for the first embodiment described above.

Additionally, as shown in FIG. 9, in preferred embodiments, hopper 12 includes a longitudinally mounted agitation bar 90, positioned generally centrally between side walls 34 and mounted between front and rear walls of the hopper. Agitation bar 90 is conveniently formed of a nylon bar or rod 91 secured between the front and rear walls of the hopper. A tube 92 is provided over nylon rod 91 and is freely rotatable on rod 91. Tube 92 is suitably formed of stainless steel. Typically, nylon rod 91 has a diameter of about 10 mm and tube 92 has an outer diameter of about 20 mm.

Further, in preferred embodiments and as shown in FIG. 9, a control or metering arrangement 93 is provided vertically intermediate the dispensing cylinder 40, 80 and the second dividing wall 31. As shown in FIG. 9, suitably the metering arrangement 93 includes a pair of tubes 95 mounted for free rotation about respective rods 94. Conveniently, both rods 94 have the same diameter and are formed of nylon and both tubes 95 have the same outside diameter and are formed of stainless steel. As shown, the pair of tubes 95 and rods 94 are mounted between the front and rear walls of the hopper 12 in a vertical orientation with a small gap therebetween, the gap being slightly larger than the diameter of the tubes 95.

In use, as sweets are pushed forwards towards and bearing against the dispensing wheel 80, the two stainless steel tubes 95 are able to move and lift, allowing a metered or measured volume of sweets to flow underneath, within each chamber 86 of the dispensing cylinder. The formation of metering arrangement 93 can be varied to accommodate the large number of different sweet types and sizes. For certain sweets, only the top or the bottom rod 94 and tube 95 combination will be required. For example, large, somewhat sticky confectionery may require both rod and tube sets; whereas more freely flowable confectionery may require just one set, dependent upon the dimension of the individual sweets. In other cases, the diameter of the or each tube 95 is selected having regard to the size and flow characteristics of the confectionery.

In preferred embodiments, the apparatus further comprising chilling and de-humidifier assemblies and other air-conditioning components as may be required having regard to the location in which the machine will be installed.

The apparatus may further comprise a ratchet and pawl arrangement associated with the dispensing cylinder to prevent contra-rotation of the cylinder.

The invention claimed is:

1. A vending machine for dispensing discrete products, wherein the vending machine comprises at least one storage container for products to be dispensed and a dispensing assembly in communication with the storage container; wherein the storage container includes a plurality of baffles to support products within the container and direct flow of products from the storage container to the dispensing assembly; wherein the dispensing assembly comprises a dispensing cylinder mounted for rotation within the machine and the dispensing assembly includes indexing means adapted to cause stepwise rotation of the dispensing cylinder; and wherein the indexing means comprises at least one indexing disc associated with the dispensing cylinder and the dispensing assembly further comprises an actuator arm associated with the indexing disc, the actuator arm being mounted for reciprocal motion.

2. A machine as claimed in claim 1 wherein the dispensing cylinder further comprises an elasticated cover or sheath.

3. A machine as claimed in claim 2 wherein the elasticated cover or sheath is formed of a rubber material, preferably polyurethane rubber.

4. A machine as claimed in claim 1 wherein the dispensing cylinder comprises a plurality of radially arranged rods.

5. A machine as claimed in claim 1 wherein the dispensing cylinder comprises a shaft having a plurality of axial dividing walls or vanes dividing the cylinder into a plurality of axial product-receiving cavities.

6. A machine as claimed in claim 5 wherein each wall or vane includes an axial aperture proximal the shaft.

7. A machine as claimed in claim 1 wherein the storage cavity is provided with a base and the reciprocatable member is arranged, as it moves between the first configuration and the second configuration, to push products along the base to the dispensing cylinder.

8. A machine as claimed in claim 1 wherein the lower pair of baffles are arranged in a V-shape configuration with a space between the baffles.

9. A machine as claimed in claim 1 wherein the upper pair of baffles are arranged in an inverted-V shape.

10. A machine as claimed in claim 1 wherein the baffles are arranged in opposed pairs, comprising an operatively upper pair and an operatively lower pair.

11. A machine as claimed in claim 1 wherein the indexing means comprises a toothed disc or gear; the actuator arm has a distal end adapted sequentially, in use, to engage and bear against a tooth of the toothed disc to advance the dispensing cylinder.

12. A machine as claimed in claim 11 wherein the actuator arm has a proximal end mounted to a reciprocatable member, wherein the reciprocatable member is moveable between a first configuration in which the distal end of the arm does not bear against a respective tooth of the toothed disc and a second configuration in which distal end of the arm bears against a tooth to advance the cylinder.

13. A machine as claimed in claim 12 wherein the reciprocatable member is moveable by means of an electric motor; wherein the electric motor has an eccentric, cam or elliptical gear mounted to the output shaft thereof and wherein the reciprocatable member includes a surface against which the eccentric, cam or elliptical gear bears, in use, to cause reciprocal movement of the reciprocatable member.

14. A machine as claimed in claim 12 wherein the reciprocatable member is moveable by means of a user-operated mechanical mechanism.

15. A machine as claimed in claim 1 further comprising at least one agitation bar.

16. A machine as claimed in claim 15 wherein the agitation bar is longitudinally positioned generally centrally between side walls of the hopper and mounted between front and rear walls of the hopper.

17. A machine as claimed in claim 15 wherein the agitation bar is formed of a bar or rod having a tube provided thereover for free rotation about the rod.

18. A machine as claimed in claim 1 further comprising a control or metering arrangement provided vertically intermediate the dispensing cylinder and a second dividing wall or baffle.

19. A machine as claimed in claim 18 wherein the metering arrangement includes at least one tube mounted for free rotation about a rod.

20. A machine as claimed in claim 19 wherein a pair of tubes and rods are mounted between the front and rear walls of the hopper in a vertical orientation with a small gap therebetween, preferably the gap being slightly larger than the diameter of the tubes.

* * * * *